United States Patent
Kolahi et al.

(10) Patent No.: US 10,816,378 B2
(45) Date of Patent: Oct. 27, 2020

(54) METHOD FOR OPERATING A CORIOLIS MASS FLOWMETER

(71) Applicant: KROHNE Messtechnik GmbH, Duisburg (DE)

(72) Inventors: Kourosh Kolahi, Duisburg (DE); Ralf Storm, Essen (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 1443 days.

(21) Appl. No.: 14/566,825

(22) Filed: Dec. 11, 2014

(65) Prior Publication Data

US 2015/0168198 A1 Jun. 18, 2015

(30) Foreign Application Priority Data

Dec. 13, 2013 (DE) ........................ 10 2013 020 603

(51) Int. Cl.
*G01F 1/84* (2006.01)

(52) U.S. Cl.
CPC .................... *G01F 1/8436* (2013.01)

(58) Field of Classification Search
CPC ..................................................... G01F 1/8436

USPC ......... 702/45, 50, 100; 73/861.357, 861.355, 73/861.356
See application file for complete search history.

(56) References Cited

U.S. PATENT DOCUMENTS

| 4,823,614 A | * | 4/1989 | Dahlin | G01F 1/8409 73/198 |
| 5,473,949 A | | 12/1995 | Cage et al. | |
| 5,497,665 A | | 3/1996 | Cage et al. | |

(Continued)

FOREIGN PATENT DOCUMENTS

| WO | 01/01086 A1 | 1/2001 |
| WO | 2007/095547 A2 | 8/2007 |

OTHER PUBLICATIONS

Kolahi et al., "Model-based density measurement with Coriolis flowmeter.", IEEE Transactions on Instrumentation and Measurement, Aug. 2006, p. 1258-1262, vol. 55, No. 4.
Storm et al., "Model-based correction of Coriolis mass flowmeters.", IEEE Transactions on Instrumentation and Measurement, Aug. 2002, p. 605-610, vol. 51, No. 4.

*Primary Examiner* — Connie C Yoha
(74) *Attorney, Agent, or Firm* — David S. Safran; Roberts Calderon Safran & Cole, P.C.

(57) ABSTRACT

A method for operating a Coriolis mass flowmeter in which the interferences when calculating the medium parameters is considered by the eigenfrequency ($f_{o1}$) of the oscillation of the measuring tube being determined in the first and second natural modes during operation of the Coriolis mass flowmeter, and at least one medium parameter ($\dot{m}$) is calculated with the aid of the oscillation measuring variable ($\Delta t$) by means of a calculation rule representing a mathematic relation between the oscillation measuring variable ($\Delta t$), the medium parameter ($\dot{m}$) and the eigenfrequencies ($f_{o1}$, $f_{o2}$) of the oscillations of the measuring tube in the first natural mode and the second natural mode, and the medium parameter ($\dot{m}$) being determined taking into consideration the current determined eigenfrequencies ($f_{o1}$, $f_{o2}$) of the oscillations of the measuring tub in the first natural mode and the second natural mode as well as the oscillation measuring variable ($\Delta t$).

12 Claims, 4 Drawing Sheets

(56) References Cited

U.S. PATENT DOCUMENTS

| | | | |
|---|---|---|---|
| 5,734,112 A | 3/1998 | Bose et al. | |
| 6,332,366 B1 * | 12/2001 | Wray | G01F 1/8418 |
| | | | 73/861.356 |
| 6,557,422 B1 | 5/2003 | Kolahi | |
| 6,763,730 B1 | 7/2004 | Wray | |
| 7,343,822 B2 | 3/2008 | Kolahi et al. | |
| 7,360,452 B2 | 4/2008 | Rieder et al. | |
| 7,360,453 B2 | 4/2008 | Rieder et al. | |
| 7,647,841 B2 | 1/2010 | Kolahi et al. | |
| 8,047,080 B2 * | 11/2011 | Ishikawa | G01F 1/60 |
| | | | 73/1.34 |
| 8,104,361 B2 | 1/2012 | Kolahi | |
| 2013/0317760 A1 | 11/2013 | Kolahi et al. | |

* cited by examiner

METHOD FOR OPERATING A CORIOLIS MASS FLOWMETER

BACKGROUND OF THE INVENTION

Field of the Invention

The invention relates to a method for operating a Coriolis mass flowmeter having at least one electric setting device, at least one electric drive as oscillation generator, having at least one measuring tube interacting with a medium and having at least one oscillation sensor, wherein the electric setting device provides an electric excitation signal for exciting the electric drive and the electric drive excites the measuring tube into oscillation in at least one first natural mode, the excited oscillation of the measuring tube is detected by the oscillation sensor as an oscillation measuring variable (x, ẋ, Δt) and wherein at least one medium parameter (ṁ) is calculated with the aid of the oscillation measuring variable (x, ẋ, Δt) by means of a calculation rule.

Description of Related Art

Coriolis mass flowmeters and methods for operating such flowmeters have been known for a long time in quite different variations. High measurement accuracy can be achieved with Coriolis mass flowmeters, with deviations partially better than 0.1% from the measured value, so that Coriolis mass flowmeters, for example, can be used in commerce requiring approved calibration.

The functionality of Coriolis mass flowmeters is based on at least one measuring tube with medium flowing through it being excited to oscillation by an oscillation generator, wherein this oscillation generator is often an electric drive, which typically is present as an electromagnetic drive. In such an electromagnetic drive, a coil has electric current flowing through it as an electric excitation signal, wherein a force can be directly exerted on the measuring tube with the coil current in conjunction with the coil. The functionality of Coriolis mass flowmeters is based on the Coriolis force of the massive medium caused by two orthogonal movements—that of the flow and that of the measuring tube—interacting with the wall of the measuring tube. This interaction of the medium on the measuring tube leads to an asymmetrical change of the measuring tube velocity in comparison to the oscillation state of the measuring tube without flow. The mass flow through the measuring tube can be determined with a higher accuracy by detecting these particularities of the oscillations of the Coriolis measuring tube with flow—typically using two oscillation sensors arranged offset to one another on the measuring tube.

The eigenfrequencies of the parts of the Coriolis mass flowmeter that can oscillate are of particular importance, i.e., essentially the eigenfrequencies of the measuring tube as oscillation element because the working point of the Coriolis mass flowmeter is typically set at eigenfrequencies of the measuring tube in order to be able to imprint the required oscillations for the induction of the Coriolis forces with a minimum amount of energy. The oscillations then carried out by the measuring tube have a certain shape, which is called the natural mode of the respective excitation. A further reason for the particular importance of eigenfrequencies in Coriolis mass flowmeters is the immediate physical coupling between the eigenfrequency of the measuring tube with flow and the effective, deflected oscillation mass (measuring tube mass and mass of the medium in the measuring tube); for example, the density of the medium can be determined using this relation.

It is known from the prior art that, in order for the measuring tube to be excited by a controller, a harmonic base signal is generated as a controller output signal in the form of a sinusoidal voltage and this sinusoidal voltage controls the electric setting device, wherein the electric setting device has the task of providing corresponding power at its outlet in order to be able to control the electric drive in a suitable manner and with sufficient power. The electric setting device is thus practically the performance link between the controller and the electric drive of the Coriolis mass flowmeter. Typically, known Coriolis mass flowmeters are equipped with an oscillation sensor, with which the oscillations of the measuring tube are detected, since physical information about the medium, called medium parameter here, e.g., the flow, the density and the viscosity of the medium, lie in the oscillation of the measuring tube interacting with the medium. In general, at least two oscillation sensors are arranged on the measuring tube arranged offset to one another, so that the movement of the measuring tube can be detected at the inlet and at the outlet. In this case, the oscillation measuring variables can be identified with ($x_i$, $x_r$, $\dot{x}_i$, $\dot{x}_r$, $\Delta t_{\dot{x}_i,\dot{x}_r}$), i.e., for the oscillation sensors arranged at the inlet and the outlet.

In order to determine the medium parameters of interest as well as the parameters of the Coriolis mass flowmeter in use, it is known to describe Coriolis mass flowmeters using a mathematical/physical model and to use this model for determining the parameters of interest. This, for example, is described in German Patent Application DE 100 02 635 A1 and corresponding U.S. Pat. No. 6,557,422 B1 or in German Patent Application DE 10 2011 100 092 A1 and corresponding U.S. Patent Application Publication 2013/0317760 A1.

The consistent description of Coriolis mass flowmeters is based, primarily, on an analysis of the ability of the measuring tube to oscillate, wherein the oscillations of the measuring tube in different natural modes are each described by a second order differential equation, wherein the differential equation for different natural modes can be coupled among one another. Such consistent descriptions are possible for different types of Coriolis mass flowmeters, for devices with straight or curved measuring tubes as well as for versions with one or several measuring tubes; the method according to the invention described further below can also be used for all types of Coriolis mass flowmeters. The excitation of the measuring tube occurs in the prior art predominantly by means of a central electric actuator (single-drive Coriolis mass flowmeter) acting on the measuring tube, which deflects both measuring tube halves in-phase and thus excites the oscillation of the measuring tube in the first natural mode; this excitation is often called the drive mode. Less often, the measuring tube is deflected by two off-center (in-phase or out-of-phase) electric drives (dual-drive Coriolis mass flowmeter) acting on the measuring tube, whereby an in-phase or out-of-phase oscillation of the measuring tube is excited in another natural mode; the out-of-phase oscillation mode is often called the Coriolis mode.

Oscillations—influenced by the flow of medium—of the measuring tube are recorded by measurement via oscillation sensors, which are often electromagnetically implemented, so that certain oscillation measuring variables are available, for example in the form of the deflection x of the measuring tube, the measuring tube velocity ẋ, or also in the form of a temporal phase shift Δt between the inlet and outlet side oscillation of the measuring tube derivable therefrom.

Under certain simplifying assumptions, it can be shown that, in good approximation, there is a relation describable with a linear equation between the mass flow through the measuring tube and the phase difference—corresponding to the time difference—between the inlet and outlet side oscillations of the Coriolis measuring tube. Consequently, a Coriolis mass flowmeter can be described in view of its mass flow characteristics in good approximation by the parameters zero point and sensitivity. Thereby, the zero point specifies the phase or time difference between the inlet and outlet side oscillation at zero flow and the sensitivity specifies the linear slope, i.e., the relation of mass flow change to phase change, —i.e., to the change of the time difference—between the inlet and outlet side oscillations.

It is seen, in practice, that there are numerous cross-sensitivities (interferences) that lead to a deviation of the actual behavior of the recorded, simple or simplified mathematical-physical relation. Such interferences are, for example, temperature and temperature gradients along the measuring tube, axial stresses in the measuring tube, fluid density, process pressure, and corrosion and abrasion of the measuring tube. In the design and operation of Coriolis mass flowmeters, it is intended to prevent the effect of interferences on the characteristics—such as zero point and sensitivity—of the Coriolis mass flowmeter. This is complex and is not always successful, so that the characteristics of the Coriolis mass flowmeter are influenced more or less by the mentioned interferences. This increases the measurement uncertainty of the measured values for mass flow and also other medium parameters.

Thus, a common option is a sensor-supported method, in which chosen interferences are measured via additional sensors, wherein phenomenological correction factors are derived therefrom and are used for correcting the measured value for the mass flow and other medium parameters. For example, temperatures are measured with temperature sensors and mechanical stress with strain gauges at predetermined locations of the measuring tube and the measured values for the interferences obtained in this manner are used in predetermined functional relations for correcting the measured value.

Unfortunately, sensor-supported methods and processes are not able to detect and completely prevent all influences of the above-mentioned interferences, since, on the one hand, sensors dedicated to all interferences cannot be installed and, on the other hand, functional interrelations between cross sensitivities and measuring variables are not entirely known for different conditions of use of the measuring device or cannot be mathematically described and/or calculated with tolerable effort. For example, the influence of temperature gradients on the sensitivity and zero point of the Coriolis mass flowmeter cannot be simply described. Additionally, the functional interrelation to be used is also dependent on the individual construction of the respective mass flowmeter.

SUMMARY OF THE INVENTION

The object of the present invention is to reduce the influence of interferences on the measured values or on the medium parameters to be determined with calculation rules.

The above derived and described object is achieved with the method described in the introduction for operating a Coriolis mass flowmeter in that the eigenfrequency $f_{01}$ of the oscillation of the measuring tube is determined in the first natural mode during operation of the Coriolis mass flowmeter, that the eigenfrequency $f_{02}$ of the oscillation of the measuring tube is determined in at least one second natural mode during operation of the Coriolis mass flowmeter, that the calculation rule produces a mathematic relation between the oscillation measuring variable $\Delta t$, the medium parameter $\dot{m}$ and the eigenfrequencies $f_{01}$, $f_{02}$ of the oscillations of the measuring tube in the first natural mode and the second natural mode and that the medium parameter $\dot{m}$ is determined taking into consideration the current determined eigenfrequencies $f_{01}$, $f_{02}$ of the oscillations of the measuring tube in the first natural mode and the second natural mode as well as the oscillation measuring variable $\Delta t$.

The method according to the invention is based on the knowledge that many interferences influence the eigenfrequencies of the oscillation of the measuring tube in the respective natural mode, so that the continual tracking of the eigenfrequency of the respectively used natural mode or the continual tracking of a predetermined mathematical relation between the eigenfrequencies of the used natural mode (e.g., the relation of the eigenfrequencies) makes a statement about the influence of the interferences. Regardless of the individual functional relations that occur between individual interferences, oscillation measuring variables, and medium parameters, the influences in total can be integrally observed by tracking the eigenfrequencies of the oscillation of the measuring tube in the observed natural modes or by tracking the predetermined mathematical relations between the eigenfrequencies of the used natural modes.

It is of importance, thereby, that not only a single eigenfrequency—namely, the eigenfrequency $f_{01}$ of the oscillation of the measuring tube in the first natural mode—is determined and tracked, but it is also of importance that the eigenfrequency $f_{02}$ of the oscillation of the measuring tube in a second natural mode is determined, so that the relation of the two eigenfrequencies to one another can be taken into consideration in the calculation rule. By continually measuring the eigenfrequencies during operation of the Coriolis mass flowmeter, the integral influences of the interferences and the cross-sensitivities can be mapped and can be taken into consideration in determining the medium parameters with the used calculation rule without the individual functional relations of the effect of different interferences on the medium parameters and its dependencies having to be known, which substantially simplifies the correction of the calculation of the medium parameters. The terms "first" natural mode and "second" natural mode do not have to be understood in a strict numerical manner, in that the first natural mode indicates the lower-frequency oscillation—i.e., base oscillation—and the second natural mode indicates the next possible harmonic oscillation; this may hold true in many cases, but different harmonic oscillations may be used or a base oscillation and a harmonic oscillation of a higher degree.

According to a preferred implementation of the method according to the invention, it is provided that the eigenfrequency $f_{01}$ of the oscillation of the measuring tube in the first natural mode and/or that the eigenfrequency $f_{02}$ of the oscillation of the measuring tube in the second natural mode is determined by specifically exciting the measuring tube in a phase-locked loop, by which a fixed phase shift is set between the excitation variable and the reaction variable, in particular with the knowledge of the relation between these variables in the case of resonance. More specifically, this can mean that the phase shift between the drive force of the electric drive and the velocity response of the measuring tube detected by the oscillation sensor is controlled using a variation of the frequency of the excitation signal at a predetermined value. In one electromagnetic drive, the drive current is directly relative to the force. In the ideal case, the phase shift between the excitation variable and the measuring tube velocity is adjusted to 0°, since the resonance case here is present with the oscillation in the eigenfrequency.

The oscillation of the measuring tube in the second natural mode can be excited with the direct use of the electric drive, with which the movement into the second natural mode is imprinted. However, it is preferred that the oscillation of the measuring tube in the second natural mode is indirectly excited with the active excitation of the measuring tube in the first natural mode. This can occur due to structural asymmetries in the construction of the Coriolis mass flowmeter, which causes a—practically impossible to avoid—coupling of the oscillation of the measuring tube in the first natural mode and further natural modes. The excitation into oscillation of the second natural mode can alternatively or additionally occur, however, due to the process itself, i.e., via the flow of the medium or via mechanical excitation of the Coriolis mass flowmeter via attachment points in the tubing. Preferably, the eigenfrequency of the second natural mode—regardless of how it is excited—is tracked using a phase-locked loop. For this, a priori knowledge about the relation between the eigenfrequencies of the measuring tube oscillations in the first natural mode and the second natural mode is advantageously used, so that the search range of the phase-locked loop can be limited to a meaningful range.

According to a further preferred implementation of the method, it is provided that the calculation rule has a term for the eigenfrequencies $f_{01}$, $f_{02}$ of the oscillations of the measuring tube in the first natural mode and the second natural mode as an integral correction function $f_{IK}$. This means that, regardless of other formulations of the calculation rule for determining medium parameters or other parameters, the calculation rule has as least one term, which is influenced by the value of the eigenfrequencies, so that this term really takes on the meaning of a correction function, since the influence of interferences is integrally suppressed in the continually tracked values for the eigenfrequencies $f_{01}$, $f_{02}$ of the oscillation of the measuring tube. In particular, such a formulation of the equation is preferred, in which the calculation rule does not have any further dependencies on the eigenfrequencies $f_{01}$, $f_{02}$ of the oscillation of the measuring tube in the first natural mode and the second natural mode, so that the influences on the described term are limited.

In detail, there are various possibilities for designing and further developing the method according to the invention as will be apparent from the following description of preferred embodiments in conjunction with the accompanying drawings.

DETAILED DESCRIPTION OF THE INVENTION

Figure 1:
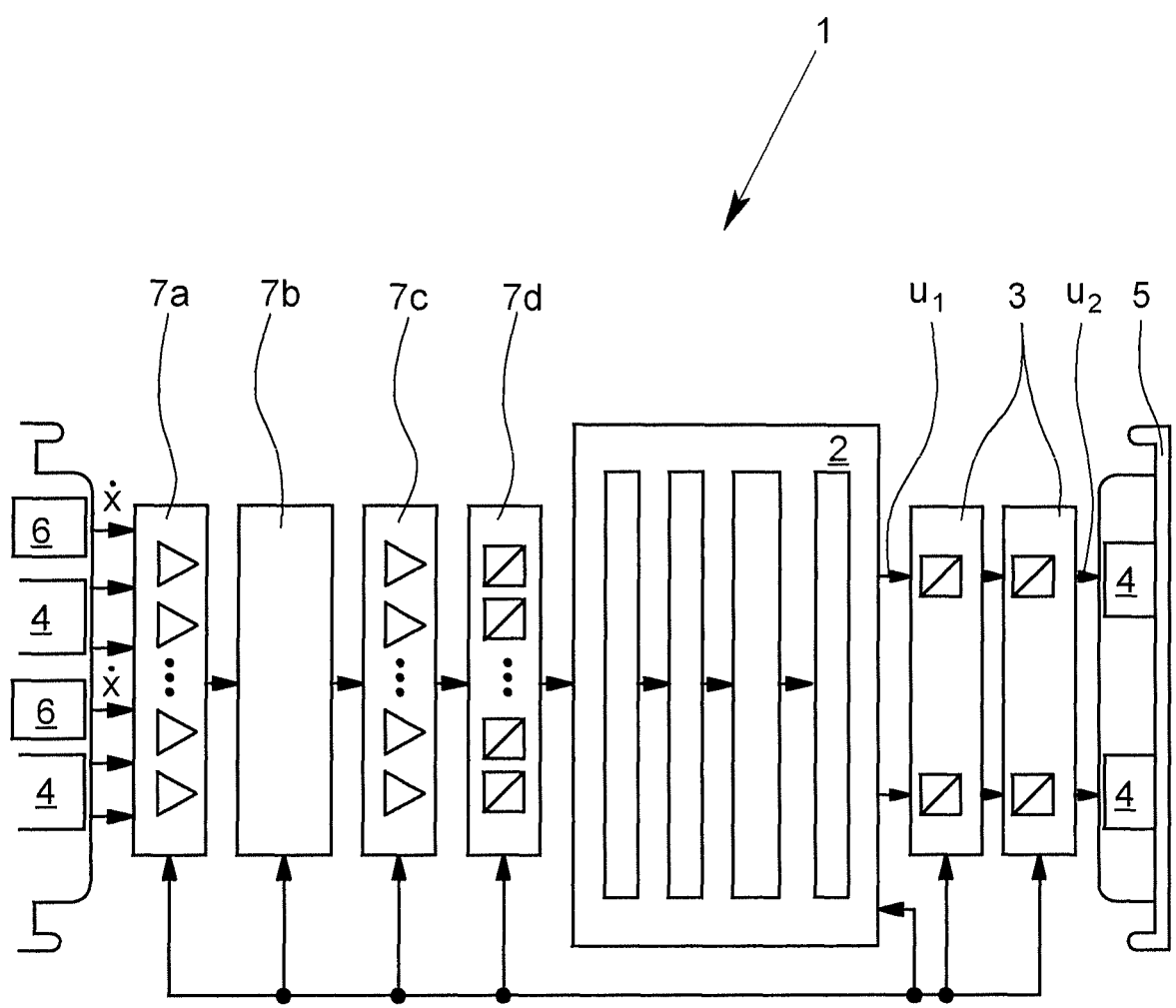
FIG. 1 schematically shows the structure of a Coriolis mass flowmeter, as it is known from the prior art, however, as it can also be used for the method according to the invention.

A Coriolis mass flowmeter 1 is initially schematically illustrated in FIG. 1, having a controller 2 in a digital signal processor, an electric setting device 3, and electric drives 4 as oscillation generators. The electric setting device 3 generates an electric excitation signal $u_2$ for exciting the electric drive 4, wherein the electric drive 4 excited the measuring tube 5 to oscillation in a first natural mode. The excited oscillation of the measuring tube 5 is detected by oscillation sensors 6 as oscillation measuring variable, wherein the measuring tube velocity $\dot{x}$ is initially detected as oscillation measuring variable. The temporal phase difference, i.e., the time difference $\Delta t$, is determined then as derived oscillation measuring variable using the inlet and outlet side measuring tube velocities.

Figure 2:
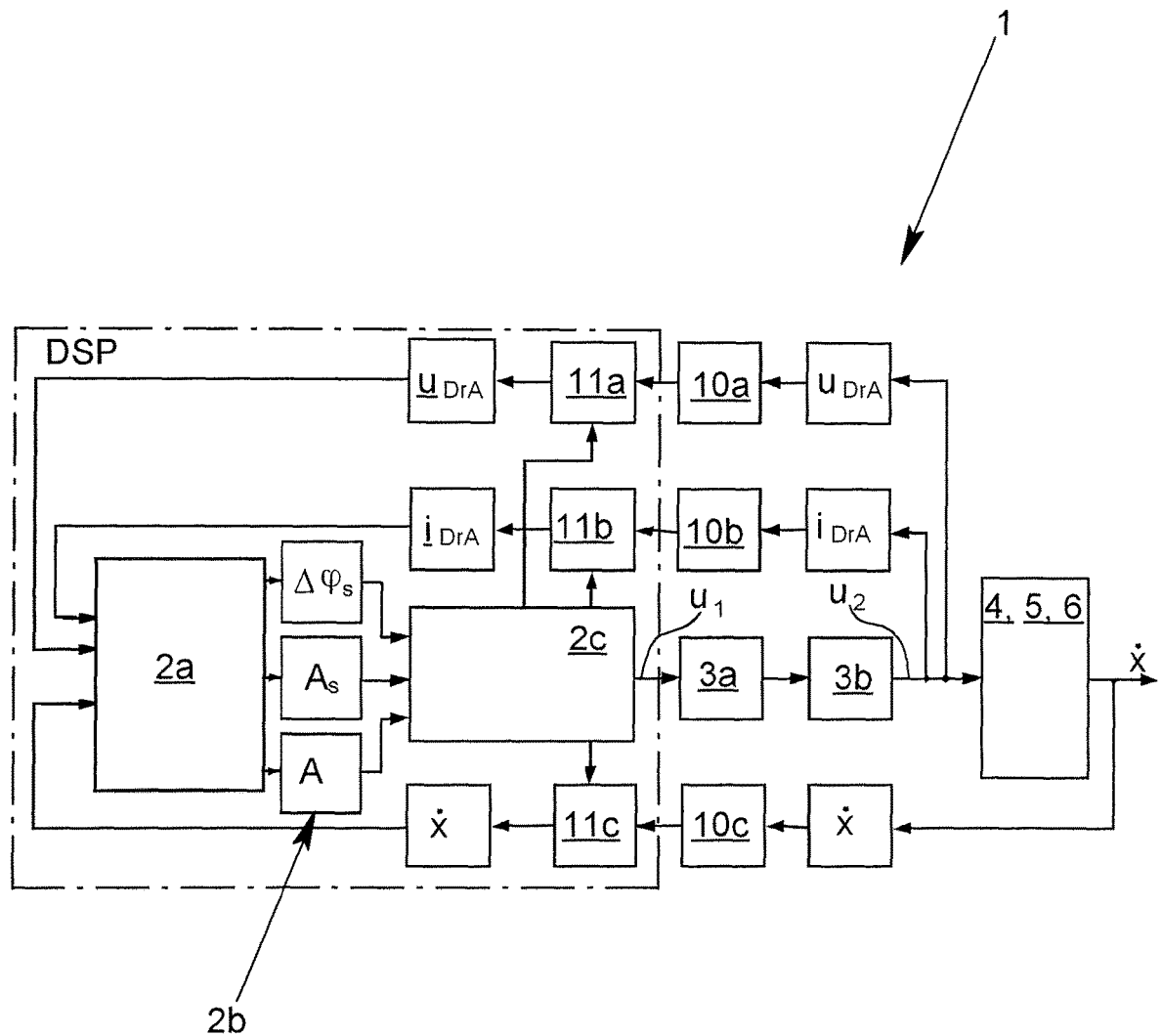
FIG. 2 is a block diagram of an embodiment of the method according to the invention of a Coriolis mass flowmeter.

In FIG. 2, the Coriolis mass flowmeter 1 is shown as two parts. The Coriolis mass flowmeter 1, which is actually formed as one unit, ends at one half on the right edge of the figure and begins again at the left edge of the drawing, for a more clear understanding of the drawing. It can be seen there, that the Coriolis mass flowmeter 1 has oscillation sensors 6, which provide velocity signals $\dot{x}$ of the measuring tube as oscillation measuring variable. Connected to the oscillation sensors 6 are numerous transmission elements, which are used essentially for signal processing, such as adaptation electronics 7a consisting of amplifiers, a hardware multiplexer 7b for implementing different switchable measuring channels, further adaptation electronics 7c and an analog/digital converter 7d, which returns the measured analog signals back to the controller 2 in the form of digital signals. In the digital signal processor 2, a medium parameter—presently the mass flow $\dot{m}$—related to the medium is finally also calculated with the aid of the (derived) oscillation measuring variable $\Delta t$ by means of a calculation rule.

The calculation rule is based on a mathematical modeling of the Coriolis mass flowmeter 1, wherein, in the following case, the measuring tube 5 is replicated in the form of a mass-spring damping system that is capable of oscillation, so that the natural modes at which the measuring tube 5 is excited to oscillation can be described in good approximation by a second order transfer function. Numerous interferences influence the Coriolis mass flowmeter 1, which can be taken into consideration in a calculation rule only with great effort or only incompletely. These types of interferences are, for example, the temperature of the measuring tube 5, temperature gradients developing over the course of the measuring tube 5, mechanical stresses, etc. If the influence of these interferences on the oscillation behavior or the Coriolis mass flowmeter 1 is functionally known, the interferences are typically measured by suitable sensors in the prior art, so that the influence of the interferences can be corrected in the scope of accuracy of the calculation rule. It is easily seen that this process can be arbitrarily complex.

The method according to the invention is based on the knowledge that many interferences influence the eigenfrequencies $f_{01}$, $f_{02}$ of the measuring tube 5 excited to oscillation at a certain natural mode, so that the changing eigenfrequencies $f_{01}$, $f_{02}$—and primarily the behavior of the eigenfrequencies—of the natural modes of the measuring tube oscillation are an integral indicator for interferences and the impact of cross sensitivities. If it is successful that the calculation represents a mathematical relation between the detected or derived oscillation measuring variable, the medium parameter of interest, and the eigenfrequencies $f_{01}$, $f_{02}$ of the oscillations of the measuring tube 5 in the used natural modes, then the continual detection of the eigenfrequencies $f_{01}$, $f_{02}$ of the oscillation of the measuring tube 5 in the used natural modes allows for possibility of a continual corrected and correct calculation of the medium parameters of interest.

Insofar, it is provided by the method according to the invention that the eigenfrequency $f_{01}$ of the oscillation of the measuring tube 5 is determined in the first natural mode during operation of the Coriolis mass flowmeter 1, that the eigenfrequency $f_{02}$ of the oscillation of the measuring tube 5 is determined in at least one second natural mode during operation of the Coriolis mass flowmeter, that such a calculation rule is used that represents a mathematic relation between the oscillation measuring variable $\Delta t$, the medium parameter $\dot{m}$ and the eigenfrequencies $f_{01}$, $f_{02}$ of the oscillations of the measuring tube 5 in the first natural mode and the second natural mode, wherein then finally the medium parameter $\dot{m}$ is determined taking into consideration the current determined eigenfrequencies $f_{01}$, $f_{02}$ of the oscillations of the measuring tube 5 in the first natural mode and the second natural mode as well as the oscillation measuring variable $\Delta t$.

In the following, the consistent description of the measuring tube oscillation is shown as an example in the first natural mode, wherein the movement equation is based on a mass-damper-spring system and the force-velocity-transfer function is shown for the first natural mode (drive mode) by:

$$G_1(s) = \frac{V_1(s)}{F_1(s)} = \frac{k_1 s}{s^2 + 2d_1\omega_{01}s + \omega_{01}^2}$$

with $$V_1(s) = \dot{X}_1(s), F_1(s) = F_l(s) + F_r(s),$$

$$k_1 = \frac{1}{m_l + m_r}, d_1 = \frac{d_l + d_r}{2\sqrt{(c_l + c_r)(m_l + m_r)}}, \omega_{01} = \sqrt{\frac{c_l + c_r}{m_l + m_r}}$$

Correspondingly, the movement equation for the oscillation of the measuring tube 5 in the second natural mode (Coriolis mode) can be described by:

$$G_2(s) = \frac{V_2(s)}{M_2(s)} = \frac{k_2 s}{s^2 + 2d_2\omega_{02}s + \omega_{02}^2}$$

with $$V_2(s) = \dot{X}_2(s), k_2 = \frac{1}{m_l L_l^2 + m_r L_r^2}, d_2 = \dots, \omega_{02} = \dots$$

In the above equations, the indices l and r represent the variables of the left and right measuring tube halves, wherein m is the mass, d is the damping and c is the spring stiffness. The parameters $\omega_{01}$ and $\omega_{02}$ are the circular eigenfrequencies of the first natural mode and the second natural mode, which differ from the eigenfrequencies $f_{01}$, $f_{02}$ only by the constant factor $2\pi$.

Figure 3:
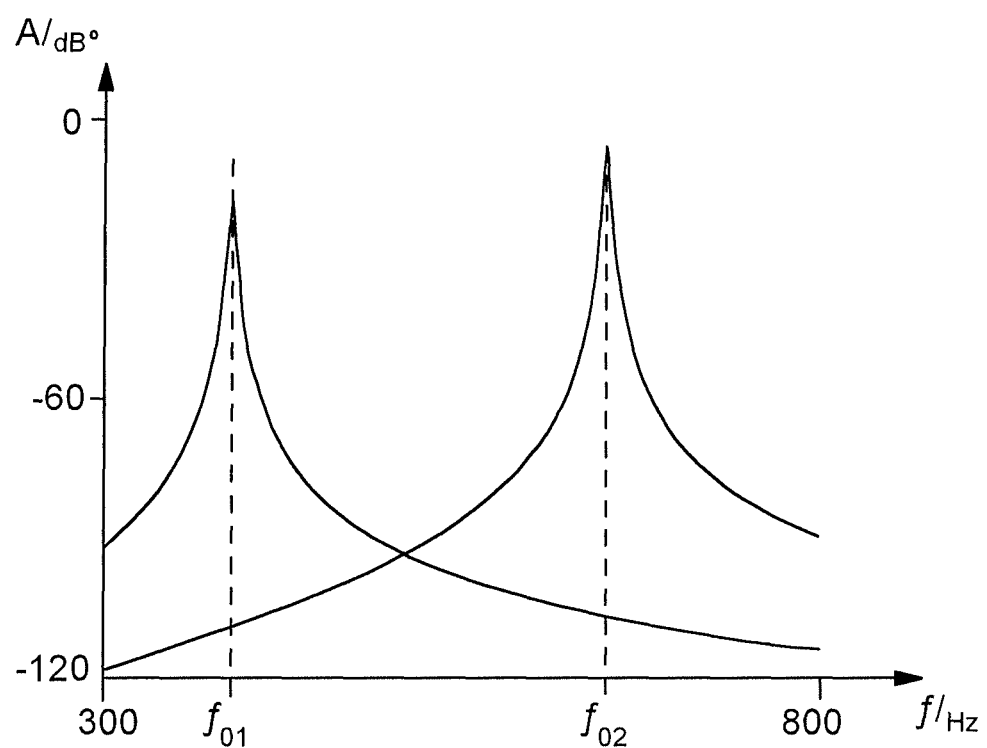
FIG. 3 is a plot of the amplitude characteristic for the oscillations of a measuring tube in a first natural mode and in a second natural mode, and FIG. 4 are plots of the amplitude diagram and the phase diagram for the oscillation of the measuring tube of a Coriolis mass flowmeter in a first natural mode with different types of media.

FIG. 3 shows typical amplitude characteristics of a Coriolis measuring tube 5 for oscillations in two different natural modes. The oscillations show the typical amplitude peaks at the eigenfrequencies $f_{01}$ and $f_{02}$. By the movement of the measuring tube 5 in the first natural mode in conjunction with the mass flow flowing through the measuring tube 5, Coriolis forces or Coriolis force pairs are induced, which excite the second natural mode. The operation frequency is typically the eigenfrequency of the first natural mode (drive mode) for reasons regarding energy as well as measurement. Typically, at this frequency, the induced Coriolis pairs are measured via the second natural mode (Coriolis mode).

Figure 4:
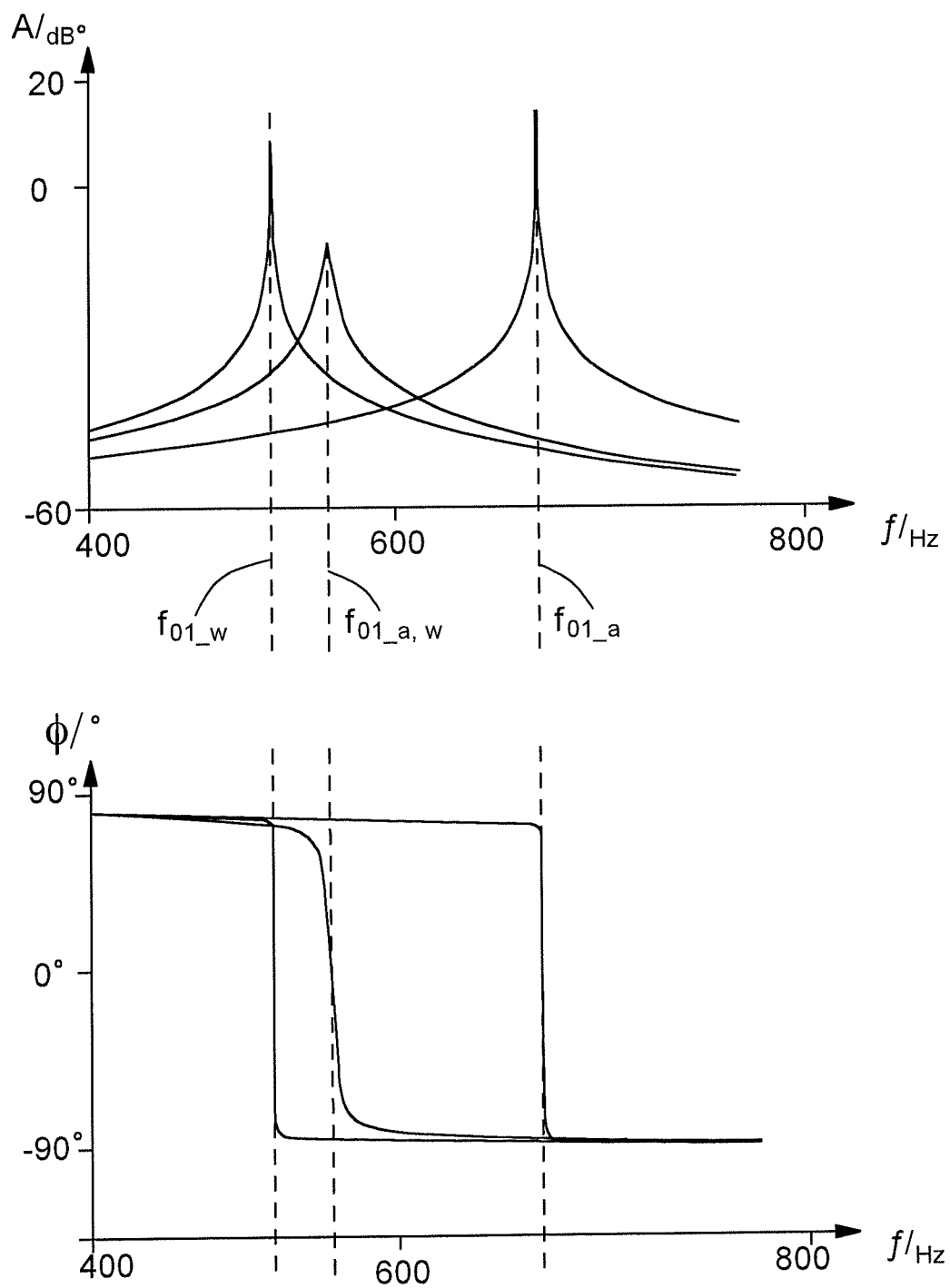

The eigenfrequencies $f_{01}$, $f_{02}$ of the different natural modes and other parameters of the measuring tube 5 change depending on a plurality of influencing variables. Among others, fluid density, filling and emptying of the device as well as operation at partial fill, multi-phase flow, viscosity temperature of the flow, temperature and temperature gradient of the surroundings, operation pressure and pressure gradients along the measuring tube 5, mechanical stress on the measuring tube 5, external vibrations, pump pulsations as well as erosion and corrosion of the measuring tube 5 and deposits on the measuring tube are all such influencing variables. For example, the stiffness of the natural modes change due to temperature and temperature gradients as well as due to the mechanical stresses acting on the measuring tube 5, which, for example, are caused by process pressure. These influencing variables or interferences can lead to the frequencies of the natural modes of the measuring tube 5 being shifted absolutely or relative to one another. This is illustrated in FIG. 4, in which the influence of fluid density on the oscillation behavior of the measuring tube 5 in the first natural mode (drive mode) is shown. The curve at the far right is the frequency path of the measuring tube 5 filled with air (eigenfrequency $f_{01\_a}$), the middle frequency path is present for a multi-phase flow of water with air (eigenfrequency $f_{01\_a,w}$), the frequency path at the far left shows the frequency behavior for a single-phase flow of water (eigenfrequency $f_{01\_w}$). It can be clearly seen that the interference shown here as an example in the form of the change between single and multi-phase flow in the eigenfrequency of the oscillation suppresses one and the same natural mode.

In the following, a typical case will be studied in that the first natural mode is used as drive mode and the second natural mode is used as measuring mode. Under the assumption that the natural mode can be described in good approximation as presently shown by a second order transfer function, the following relation for the sensitivity and the zero point of the Coriolis mass flowmeter can be obtained using the following equation as measurement equation:

$$\Delta t \approx \frac{1}{\omega_{01}} \cdot \frac{\text{Re}\{V_1\}\text{Im}\{V_2\} - \text{Im}\{V_1\}\text{Re}\{V_2\}}{\text{Re}^2\{V_1\} + \text{Im}^2\{V_1\}}$$

$$= \underbrace{\frac{1}{\omega_{01}} \cdot \text{Im}\{G_2\} \cdot K_{CN} \cdot \dot{m}}_{E} + \underbrace{\frac{1}{\omega_{01}} \cdot \text{Im}\{G_2\} \cdot K_V}_{N}$$

$$\approx \frac{1}{\omega_{01}} \cdot \frac{\frac{1}{m_2}\omega_{01}}{\underbrace{\omega_{02}^2 + j2D_2\omega_{02}\omega_{01} - \omega_{01}^2}_{=0}} (K_{CN} \cdot \dot{m} + K_V)$$

$$\approx \frac{\omega_{02}^2}{\omega_{02}^2 - \omega_{01}^2} \cdot \frac{1}{c_2} (K_{CN} \cdot \dot{m} + K_V)$$

$\Delta t$ temporal shift of both sensor signals
$\omega_{01}$ (circular) eigenfrequency of the first natural mode (drive mode)
$\omega_{02}$ (circular) eigenfrequency of the second natural mode (measuring mode, Coriolis mode)
$c_2$ spring stiffness of the second natural mode
$K_{CN}$ coefficient of the normal mode (first natural mode as drive mode)
$\dot{m}$ mass flow
$K_V$ velocity proportional coupling of both natural modes without mass flow
$\text{Re}\{V_1\}$ real part of the velocity of the first natural mode
$\text{Im}\{V_1\}$ imaginary part of the velocity of the first natural mode
$\text{Re}\{V_2\}$ real part of the velocity of the second natural mode Im{V$_2$} imaginary part of the velocity of the second natural mode Im{G$_2$} imaginary part of the transfer function of the second natural mode m$_2$ oscillating mass of the second natural mode D$_2$ standardized damping constant of the second natural mode The variable available using measurement is, in this case, on the left side of the equation, namely the oscillation measuring variable □t, on the right side of the equation are internal variables of the Coriolis mass flowmeter that are not as easily available. Converting the above equation results in:

$$\Delta t \approx \frac{1}{1 - \frac{\omega_{01}^2}{\omega_{02}^2}} \cdot \frac{1}{c_2}(K_{CN} \cdot \dot{m} + K_V)$$

$$= f_{IK}(T, \Delta T, P, \sigma, \Delta\sigma, \ldots) \cdot (K_{CN} \cdot \dot{m} + K_V)$$

Here, it has been clearly achieved that the calculation rule has a term in the eigenfrequencies $f_{01}$, $f_{02}$ of the oscillation of the measuring tube 5 in the first natural mode and the second natural mode as integral correction function $f_{IK}$, wherein the calculation rule shows no further dependencies on the eigenfrequencies $f_{01}$, $f_{02}$ of the oscillation of the measuring tube 5 in the first natural mode and the second natural mode. The integral correction function is thus:

$$f_{IK}(T, \Delta T, P, \sigma, \Delta\sigma, \Box) = \frac{1}{1 - \frac{\omega_{01}^2}{\omega_{02}^2}} \cdot \frac{1}{c_2}$$

The two above equations show that it is now possible to determine the medium parameter $\dot{m}$ of interest by converting the equation, when knowledge of the eigenfrequencies $f_{01}$, $f_{02}$—synonymous with knowledge of the circular eigenfrequencies $\omega_{01}$, $\omega_{02}$—of the oscillations of the measuring tube 5 in the first natural mode and second natural mode exists. For continuous and thus always current determination of the eigenfrequencies $f_{01}$, $f_{02}$ of the oscillation of the measuring tube 5 in the first natural mode, it is provided that the measuring tube 5 is specifically excited in a phase-locked loop, wherein the phase shift between the drive force of the electric drive 4 and the velocity response of the measuring tube 5 detected via the oscillation sensor 6 is controlled using a variation of the frequency of the excitation signal $u_1$, $u_2$ at a predetermined value; in the ideal case the predetermined phase difference is 0°.

The measuring tube 5 is excited to oscillation in its second natural mode by the active excitation of the oscillation of the measuring tube 5 in the first natural mode, so that a specific separate excitation is not necessary. The eigenfrequency of the second natural mode is also tracked via a phase-locked loop. Using these measures, it is always possible to obtain a current value of the eigenfrequencies $f_{01}$, $f_{02}$ influenced by interferences, so that also current and corrected values for the medium parameter $\dot{m}$ of interest can be calculated.

The phase control is implemented in FIG. 1 in a digital signal processor (DSP) using the controller 2. In FIG. 2, it is shown in more detail how signal paths in the implemented controls are implemented within the Coriolis mass flowmeter 1. The dashed border compiles blocks together that are functionally implemented in the digital signal processor (DSP). The controller 2 is shown here overall in parts. The calculation rule and the determination equation for the medium parameter $\dot{m}$ of interest are stored in the controller part 2a. The actual controller is implemented in the controller part 2b, for example, phase control at the very top, amplitude control in the middle, and amplitude adjusting at the bottom. Output of the controller 2 are parameters that are implemented by the subsequent signal generator 2c. First, two orthogonal, harmonic excitation signals are generated in the signal generator 2c for exciting the measuring tube 5; the controller output signal $u_1$ is then generated from these two signals. The, also harmonic, measuring variables, which are returned to the DSP via the analog/digital converter 10a, 10b, are separated into signal components in the modulators 11a, 11b with the help of the orthogonal base signal of the signal generator 2c; these signals allow for the determination of the phasing of the signals in respect to the base signal, so that after demodulation, phase information regarding the output signal of the signal generator 2c is available. The harmonic measuring variables consist presently in the drive clamping voltage $u_{DrA}$ and the drive clamping current $i_{DrA}$. The measuring tube velocity $\dot{x}$ is detected as oscillation measuring variable and returned to the DSP, whereby, finally, phase information can also be obtained.

The following equations show the above-derived relations again using the already-explained parameters sensitivity E and zero point N. Thus, it can be seen that the temporal offset—i.e., the phase shift—between the input and output side measuring tube oscillation □t can be illustrated using a linear equation depending on the mass flow rate $\dot{m}$. The influences of the interferences are taken into consideration in the correction function $f_{IK}$ or the simplified correction function $f_{IKV}$ without spring stiffness $c_2$ of the measuring tube 5 in the second natural mode, insofar as these influence the eigenfrequencies $f_{01}$, $f_{02}$ of the measuring tube 5 in the first natural mode and the second natural mode.

$$\Delta t = \frac{1}{1 - \frac{\omega_{01}^2}{\omega_{02}^2}} \cdot \frac{1}{c_2}(K_{CN} \cdot \dot{m} + K_V) = E \cdot \dot{m} + N$$

$$E = \frac{1}{1 - \frac{\omega_{01}^2}{\omega_{02}^2}} \cdot \frac{1}{c_2} \cdot K_{CN} = f_{IKV} \cdot \frac{1}{c_2} \cdot K_{CN} = f_{IK} \cdot K_{CN}$$

$$N = \frac{1}{1 - \frac{\omega_{01}^2}{\omega_{02}^2}} \cdot \frac{1}{c_2} \cdot K_V = f_{IKV} \cdot \frac{1}{c_2} \cdot K_V = f_{IK} \cdot K_V$$

E sensitivity

N zero point $f_{IKV}$ simplified correction function $f_{IK}$ correction function Among others, the initial value for the sensitivity E, the zero point N, the simplified correction function $f_{IKV}$, and the correction function $f_{IK}$ can be determined during factory calibration of the Coriolis mass flowmeter 1 and, for example, stored for a comparison at a later time. In such factory calibration, the values of the zero point N and the value of the correction function $f_{IK}$ are preferably then determined when the flow $\dot{m}$ is equal to zero. Then, the following equation relations are used:

$$\dot{m}_K = 0 \Rightarrow \Delta t_{\dot{m}=0}$$
$$= \frac{1}{1 - \frac{\omega_{01,In}^2}{\omega_{02,In}^2}} \cdot \frac{1}{c_{2,In}} \cdot K_V$$
$$= N_{In}$$

$$f_{IKV,In} = \frac{1}{1 - \frac{\omega_{01,In}^2}{\omega_{02,In}^2}}$$

$$f_{IK,In} = \frac{1}{1 - \frac{\omega_{01,In}^2}{\omega_{02,In}^2}} \cdot \frac{1}{c_{2,In}}$$

$$N_{In} = f_{IKV,In} \cdot \frac{1}{c_{2,In}} \cdot K_V = f_{IK,In} \cdot K_V$$

The sensitivity E is then determined at a predetermined known flow, namely using the following equations:

$$\dot{m} = \dot{m}_K \Rightarrow \Delta t_{\dot{m}=\dot{m}_K}$$
$$= \frac{1}{1 - \frac{\omega_{01,In}^2}{\omega_{02,In}^2}} \cdot \frac{1}{c_{2,In}}(K_{CN} \cdot \dot{m}_K + K_V)$$
$$= E_{In} \cdot \dot{m}_K + N_{In}$$

$$E_{In} = \frac{1}{1 - \frac{\omega_{01,In}^2}{\omega_{02,In}^2}} \cdot \frac{1}{c_{2,In}} \cdot K_{CN} = \frac{\Delta t_{\dot{m}=\dot{m}_K} - N_{In}}{\dot{m}_K}$$

$$E_{In} = f_{IKV,In} \cdot \frac{1}{c_{2,In}} \cdot K_{CN} = f_{IK,IN} \cdot K_{CN}$$

If the interferences and cross sensitivities do not change the characteristics of the Coriolis mass flowmeter 1 during operation, then the determination equation for the mass flow is simply:

$$\dot{m} = \frac{\Delta t_{\dot{m}}}{E_{In}} - N_{In}$$

In the above-mentioned case, further calculation can take place using the initial values. A change of the characteristic variables of the Coriolis mass flowmeter 1 can be observed by tracking the eigenfrequencies $f_{01}$, $f_{02}$ of the oscillations of the measuring tube 5 in the natural modes. If such changes exist, the correction function has to be calculated, wherein the current values of the correction functions $f_{IKV,Ak}$ and $f_{IK,Ak}$ are obtained in that the current values for the (circular) eigenfrequencies $f_{01}$, $f_{02}$ as well as the spring stiffness of the measuring tube 5 in the second natural mode (Coriolis mode) are determined and applied:

$$f_{IKV,Ak} = \frac{1}{1 - \frac{\omega_{01,Ak}^2}{\omega_{02,Ak}^2}}$$

$$f_{IK,Ak} = \frac{1}{1 - \frac{\omega_{01,Ak}^2}{\omega_{02,Ak}^2}} \cdot \frac{1}{c_{2,Ak}}$$

The index addition "Ak" identifies the current value of the respective variable. On this basis, the current value of the zero point N and the sensitivity E can be calculated:

$$N_{Ak} = f_{IKV,Ak} \cdot \frac{1}{c_{2,Ak}} \cdot K_V = f_{IK,Ak} \cdot K_V = f_{IK,Ak} \cdot \frac{N_{In}}{f_{IK,In}}$$

$$E_{Ak} = f_{IKV,Ak} \cdot \frac{1}{c_{2,Ak}} \cdot K_{CN} = f_{IK,Ak} \cdot K_{CN} = f_{IK,Ak} \cdot \frac{E_{In}}{f_{IK,In}}$$

The temporal shift of the velocity signal that has not been corrected (the index addition NK identifies the respective, non-corrected value):

$$\Delta t_{\dot{m},NK} = \frac{1}{1 - \frac{\omega_{01,Ak}^2}{\omega_{02,Ak}^2}} \cdot \frac{1}{c_{2,Ak}}(K_{CN} \cdot \dot{m} + K_V) = E_{Ak} \cdot \dot{m} + N_{Ak}$$

Thus, the non-corrected current value of the mass flow $\dot{m}_{NK}$ is then:

$$\dot{m}_{NK} = \frac{\Delta t_{\dot{m},NK}}{E_{In}} - N_{In}$$

The correction of the measured value for the flow $\dot{m}$ can now take place by taking the current zero point N and the current sensitivity E into consideration, wherein the index addition $K_0$ identifies the corrected value:

$$\dot{m}_{Ko.} = \frac{\Delta t_{\dot{m},NKo.}}{E_{Ak}} - N_{Ak} = \frac{1}{E_{In}} \cdot \frac{f_{IK,In}}{f_{IK,Ak}} \cdot \Delta t_{\dot{m},NKo.} - \frac{f_{IK,Ak}}{f_{IK,In}} \cdot N_{In}$$

The correction of the measured value for the flow can be carried out, preferably using the correction of the temporal shift of the velocity signal, i.e., using:

$$\Delta t_{\dot{m},NKo.} = E_{Ak} \cdot \dot{m} + N_{Ak} = f_{IK,Ak} \cdot \frac{E_{In}}{f_{IK,In}} \cdot \dot{m} + f_{IK,Ak} \cdot \frac{N_{In}}{f_{IK,In}} =$$
$$\underbrace{\frac{f_{IK,Ak}}{f_{IK,In}}(E_{In} \cdot \dot{m} + N_{In})}_{\Delta t_{\dot{m},Ko.}} \Rightarrow \Delta t_{\dot{m},Ko.} = \frac{f_{IK,In}}{f_{IK,In}} \cdot \Delta t_{\dot{m},NKo.}$$

The corrected value of the mass flow $\dot{m}$ ensues using the above result:

$$\dot{m}_{Ko.} = \frac{\Delta t_{\dot{m},Ko.}}{E_{In}} - N_{In}$$

A comparison of the current parameters of the calculation rule with values of the same parameters of the calculations rule at an initial point in time allows the implementation of diagnostic functions in a very different manner. For this, a suitable parameter of the calculation rule is determined at an initial point in time and the initial value of the parameter obtained in this manner is compared to a current value of the parameter determined at a later point in time. Then, for example, a signal can be issued when a predetermined maximum deviation of the current parameter from the initial value of the parameter is exceeded. This, for example, can be implemented using the following relation ("abs" identifies the value of the respective term):

$$\text{abs}\left(\frac{\Delta f_{IK,Ak}}{f_{IK,In}}\right) = \text{abs}\left(\frac{f_{IK,Ak} - f_{IK,In}}{f_{IK,In}}\right) > K_{Schwellwert} \Rightarrow \text{Status} - \text{Signal}$$

Of course, the deviations of the characteristic variables of the Coriolis mass flowmeter in respect to its initial values can also be used for diagnostic purposes, which could be implemented as follows:

$$\text{abs}(\Delta E) = \text{abs}\left(\frac{E_{Ak} - E_{In}}{E_{In}}\right)$$
$$= \text{abs}\left(\frac{f_{IK,Ak}}{f_{IK,In}} - 1\right) > K_{Schwellwert} \Rightarrow \text{Status} - \text{Signal}$$

$$\text{abs}(\Delta N) = \text{abs}\left(\frac{N_{Ak} - N_{In}}{N_{In}}\right)$$
$$= \text{abs}\left(\frac{f_{IK,Ak}}{f_{IK,In}} - 1\right) > K_{Schwellwert} \Rightarrow \text{Status} - \text{Signal}$$

Corresponding corrections of the measured value and of characteristic variables as well as the generation of status signals can be carried out using the simplified correction function, wherein a correction of the spring stiffness of the Coriolis mode is carried out here with the help of the measured temperature.

What is claimed is:

1. Method for operating a Coriolis mass flowmeter having at least one electric setting device, at least one electric drive forming an oscillation generator, at least one measuring tube interacting with a medium and having at least one oscillation sensor, comprising the steps of:
using the electric setting device to provide an electric excitation signal for exciting the electric drive,
using the electric drive to excite the measuring tube into oscillation in at least one first natural mode,
detecting the excited oscillation of the measuring tube with the oscillation sensor as an oscillation measuring variable (x, ẋ, Δt)
calculating at least the mass flow of a medium through the measuring tube as one medium parameter (ṁ) with the aid of the oscillation measuring variable (Δt) by means of a calculation rule, and
reducing the influence of interferences on measured values or on medium parameters to be determined by:
determining a first eigenfrequency ($f_{01}$) of the oscillation of the measuring tube in the first natural mode during operation of the Coriolis mass flowmeter,
determining a second eigenfrequency ($f_{02}$) of the oscillation of the measuring tube in at least one second natural mode during operation of the Coriolis mass flowmeter,
wherein a calculation rule represents a mathematic relation between the oscillation measuring variable (Δt), the medium parameter (ṁ) and the first and second eigenfrequencies ($f_{01}$, $f_{02}$) of the oscillations of the measuring tube in the first and second natural modes,
wherein the medium parameter (ṁ) is determined taking into consideration current determined eigenfrequencies ($f_{01}$, $f_{02}$) of the oscillations of the measuring tube in the first and second natural modes as well as the oscillation measuring variable (Δt),
wherein the calculation rule has a term for the eigenfrequencies ($f_{01}$, $f_{02}$) of the oscillations of the measuring tube in the first natural mode and the second natural mode as an integral correction function $f_{IK}$,
wherein a term for the integral correction function $f_{IK}$ depending on the eigenfrequencies ($f_{01}$, $f_{02}$) of the oscillations of the measuring tube in the first natural mode and the second natural mode has the following form $$\frac{1}{1 - \frac{\omega_{01}^2}{\omega_{02}^2}}$$

wherein $\omega_{01}$ is a circular eigenfrequency of the oscillation in the first natural mode and $\omega_{02}$ is a circular eigenfrequency of the oscillation in the second natural mode,
wherein the eigenfrequencies are continually measured during operation of the Coriolis mass flowmeter and calculation of the mass flow as the medium parameter is continuously corrected using the integral correction function with the continuously measured eigenfrequencies,
wherein corrected measured values and characteristic variables of the flow through the measurement tube, in which the influence of interferences has been reduced, are output.

2. Method according to claim 1, wherein at least one of the first eigenfrequency ($f_{01}$) of the oscillation of the measuring tube is determined in the first natural mode and the second eigenfrequency ($f_{02}$) of the oscillation of the measuring tube is determined in the second natural mode by specifically exciting the measuring tube in a phase-locked loop.

3. Method according to claim 2, wherein a phase shift between a driving force of the electric drive and a velocity response (ẋ) of the measuring tube detected via the oscillation sensor is regulated using a variation of the frequency of the excitation signal at a predetermined value.

4. Method according to claim 1, wherein the oscillation of the measuring tube is excited in the second natural mode by at least one of actively exciting the oscillation of the measuring tube in the first natural mode based on structural asymmetries and excitation tracking the eigenfrequency of the second natural mode via a phase-locked loop.

5. Method according to claim 1, wherein the calculation rule has a term for the eigenfrequencies ($f_{01}$, $f_{02}$) of the oscillations of the measuring tube in the first natural mode and the second natural mode as an integral correction function $f_{IK}$.

6. Method according to claim 5, wherein the calculation rule has no further dependencies on the eigenfrequencies ($f_{01}$, $f_{02}$) of the oscillations of the measuring tube in the first natural mode and the second natural mode.

7. Method according to claim 5, wherein a term for the integral correction function $f_{IK}$ depending on the eigenfrequencies ($f_{01}$, $f_{02}$) of the oscillations of the measuring tube (5) in the first natural mode and the second natural mode has the following form $$\frac{1}{1-\frac{\omega_{01}^2}{\omega_{02}^2}}$$

wherein $\omega_{01}$ is the circular eigenfrequency of the oscillation in the first natural mode and $\omega_{02}$ is the circular eigenfrequency of the oscillation in the second natural mode.

8. Method according to claim 5, wherein the integral correction function $f_{IK}$ is additionally dependent on spring stiffness $c_2$ of the measuring tube in oscillation in the second natural mode.

9. Method according to claim 6, wherein an integral correction function $f_{IK}$ has the following form:

$$f_{IK}(T, \Delta T, P, \sigma, \Delta\sigma, \ldots) = K \cdot \frac{1}{1-\frac{\omega_{01}^2}{\omega_{02}^2}} \cdot \frac{1}{c_2}.$$

10. Method according to claim 1, wherein the medium parameter ($\dot{m}$) pertaining to the medium, the oscillation measuring variable ($\Delta t$), the eigenfrequency ($f_{01}$) of the oscillation of the measuring tube in the first natural mode and the eigenfrequency ($f_{02}$) of the oscillation of the measuring tube in the second natural mode correlate to one another according to the following calculation rule:

$$\Delta t \approx \frac{1}{1-\frac{\omega_{01}^2}{\omega_{02}^2}} \cdot \frac{1}{c_2}(K_{CN}\cdot\dot{m}+K_V) =$$

$$f_{IK}(T, \Delta T, P, \sigma, \Delta\sigma, \ldots)\cdot(K_{CN}\cdot\dot{m}+K_V)$$

wherein $\omega_{01}$ is the circular eigenfrequency of the oscillation in the first natural mode and $\omega_{02}$ is the circular eigenfrequency of the oscillation in the second natural mode.

11. Method according to claim 1, wherein at least one parameter of the calculation rule is determined at an initial point in time and an initial value obtained in this manner is compared to a current value of the at least one parameter that is determined at a later point in time and a signal is issued when a predetermined maximum deviation of the current parameter value from the initial value of the parameter is exceeded.

12. Method according to claim 11, wherein the parameter of the calculation rule is one of the value of the correction function ($f_{IK}$), a zero point (N) of the Coriolis mass flowmeter, and a sensitivity (E) of the Coriolis mass flowmeter.

* * * * *